United States Patent
Gillies et al.

(10) Patent No.: US 11,639,462 B2
(45) Date of Patent: May 2, 2023

(54) INTENTIONAL DEGRADATION OF HOLLOW PARTICLES FOR ANNULAR PRESSURE BUILD-UP MITIGATION

(71) Applicant: Halliburton Energy Services, Inc., Houston, TX (US)

(72) Inventors: James Neil Gillies, Kuala Lumpur (MY); Thomas Jason Pisklak, Cypress, TX (US); Xueyu Pang, Tomball, TX (US); Richard F. Vargo, Jr., Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 7 days.

(21) Appl. No.: 17/107,557

(22) Filed: Nov. 30, 2020

(65) Prior Publication Data

US 2022/0169907 A1 Jun. 2, 2022

(51) Int. Cl.
*C09K 8/40* (2006.01)
*C09K 8/487* (2006.01)
*C09K 8/38* (2006.01)

(52) U.S. Cl.
CPC .............. *C09K 8/40* (2013.01); *C09K 8/38* (2013.01); *C09K 8/487* (2013.01)

(58) Field of Classification Search
CPC ........ C09K 8/487; C09K 8/493; C09K 8/467; C09K 8/40; C09K 8/03
See application file for complete search history.

(56) References Cited

U.S. PATENT DOCUMENTS

| | | | |
|---|---|---|---|
| 4,450,010 A * | 5/1984 | Burkhalter | C04B 28/02 106/672 |
| 6,776,237 B2 | 8/2004 | Dao et al. | |
| 7,096,944 B2 | 8/2006 | Vargo, Jr. et al. | |
| 7,666,807 B2 | 2/2010 | Savannah | |
| 8,183,186 B2 | 5/2012 | Luo et al. | |
| 9,631,132 B2 | 4/2017 | Ravi et al. | |
| 2003/0114314 A1 * | 6/2003 | Ballard | C09K 8/536 507/100 |
| 2006/0016599 A1 * | 1/2006 | Badalamenti | E21B 33/14 166/285 |
| 2010/0236780 A1 * | 9/2010 | Hermes | E21B 33/13 166/288 |
| 2011/0120716 A1 * | 5/2011 | Williams | C04B 26/04 166/293 |
| 2014/0262529 A1 * | 9/2014 | Quintero | C09K 8/528 175/69 |
| 2014/0345878 A1 * | 11/2014 | Murphree | C09K 8/94 166/377 |
| 2015/0013988 A1 | 1/2015 | Ravi et al. | |
| 2020/0157404 A1 * | 5/2020 | Lin | E21B 33/1208 |

FOREIGN PATENT DOCUMENTS

| | | | |
|---|---|---|---|
| CA | 3035017 A1 | 5/2018 | |
| EP | 3235890 A1 * | 10/2017 | ............. C04B 28/02 |
| EP | 3036301 | 10/2019 | |
| WO | 2010-051165 | 5/2010 | |
| WO | WO-2017018998 A1 * | 2/2017 | ............... C09K 8/66 |

OTHER PUBLICATIONS

LaPlante, et al., J. Phys Chem. C 2019, 123, 3687-3695, Enhancing Silicate Dissolution Kinetics in Hyperalkaline Environments, Jan. 2019.
3M Hollow Glass Microspheres—Budov, V. V. (1994). Hollow glass microspheres, use, properties, and technology (Review). Glass and Ceramics, 51(7-8), 230-235.
Hollowlite Hollow Glass Microspheres, Available at https://en.hollowlite.com/products/Hollw-Glass-Sphere-HL38.html. Accessed website Nov. 23, 2020.
Trelleborg, Hollow Glass Microspheres, Available at https://www.trelleborg.com/en/applied-technologies/material-excellence/hollow-glass-microspheres. Accessed website Nov. 23, 2020.
Potters, Engineered Glass Materials Division, Hollow Glass Microspheres, Sphericel General PDS-2011-Ir. Available atl https://www.pqcorp.com/brands/potters-industries. Accessed website Nov. 23, 2020.
Leong, V. H., & Ben Mahmud, H. (2018). A preliminary screening and characterization of suitable acids for sandstone matrix acidizing technique: a comprehensive review. Journal of Petroleum Exploration and Production Technology.
International Search Report and Written Opinion for Application No. PCT/US2020/065006, dated Aug. 20, 2021.

* cited by examiner

*Primary Examiner* — Angela M DiTrani Leff
(74) *Attorney, Agent, or Firm* — Thomas Rooney; C. Tumey Law Group PLLC

(57) ABSTRACT

A method of servicing a wellbore may comprise providing a treatment fluid comprising a carrier fluid and hollow particles, wherein the hollow particles may comprise an outer wall that encapsulates a gas. The method may further comprise introducing the treatment fluid into a wellbore annulus and trapping at least a portion of the treatment fluid in the wellbore annulus. The carrier fluid may degrade the outer wall of the hollow particles in the wellbore annulus and release the encapsulated gas.

20 Claims, 3 Drawing Sheets

INTENTIONAL DEGRADATION OF HOLLOW PARTICLES FOR ANNULAR PRESSURE BUILD-UP MITIGATION

BACKGROUND

Spacer fluids are often used in subterranean operations to facilitate improved displacement efficiency when introducing new fluids into a wellbore. For example, a spacer fluid may be used to displace a fluid in a wellbore before introduction of another fluid. When used for drilling fluid displacement, spacer fluids may enhance solids removal as well as separate the drilling fluid from a physically incompatible fluid. For instance, in well cementing operations, the spacer fluid may be placed into the wellbore to separate the cement composition from the drilling fluid. If the spacer fluid does not adequately displace the drilling fluid, the cement composition may fail to bond to the pipe string and/or the formation to the desired extent.

Cement compositions may be used in a variety of subterranean applications. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the wellbore annulus, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion.

Hydrocarbon production from the subterranean well may be initiated at some point in time after the cementing operation is complete. For example, hydrocarbons may be produced at the surface after flowing into the wellbore and up through the pipe string. These hydrocarbons (e.g., oil, gas, etc.) may be at elevated temperatures as they flow up through the casing or tubing, thus transferring heat through the pipe string into the wellbore annulus. This may cause fluids in the wellbore annulus to expand. For example, spacer fluids remaining in the wellbore annulus above the cement sheath may heat and expand. Such an expansion may cause an increase in pressure within the wellbore annulus, which is commonly referred to as "annular pressure buildup" ("APB"). APB typically occurs when the annular volume is fixed. For instance, the wellbore annulus may be closed (e.g., trapped) to isolate fluids in the wellbore annulus from outside the annulus. Closing the wellbore annulus typically occurs near the end of the cementing operation after well completion fluids such as spacer fluids and cement compositions are in place. By way of example, the wellbore annulus may be closed by closing a valve, energizing a seal, and the like. However, if a fluid trapped in the closed wellbore annulus experiences a temperature increase, a large pressure increase may be expected because the volume in the wellbore annulus is fixed. In some instances, this pressure increase may cause damage to the wellbore, such as damage to the cement sheath, casing, tubulars, or other equipment in the wellbore.

A number of different techniques have been used to combat APB, including use of a syntactic foam wrapping on the casing, placing nitrified spacer fluids above the cement in the annulus, placing rupture disks in an outer casing string, designing "shortfalls" in the primary cementing operations such as designing the top of the cement column in an annulus to be short of the previous casing shoe, using hollow particles, and others. However, such methods have drawbacks. For instance, the syntactic foam may cause flow restrictions during primary cementing of the casing within the wellbore. In addition, the syntactic foam may detach from the casing and/or become damaged as the casing is installed. Drawbacks with placing the nitrified spacer fluids include logistical difficulties (e.g., limited room for the accompanying surface equipment), pressure limitations on the wellbore, and the typical high expenses related thereto. Further drawbacks with placing the nitrified spacer fluids include loss of returns when circulating the nitrified spacer into place and in situations wherein the geographic conditions provide difficulties in supplying the proper equipment for pumping the nitrified spacer. Additional drawbacks include failure of the rupture disks halting wellbore operations. Further drawbacks include the designed "shortfall," which may not occur due to wellbore fluids not being displaced as designed and cement channeling up to a casing shoe and trapping it. Generally, the use of hollow particles was deemed problematic for reasons including the failure of the hollow particles before placement in the annulus and the inability of the hollow particles to withstand repeated changes in pressure and temperature.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
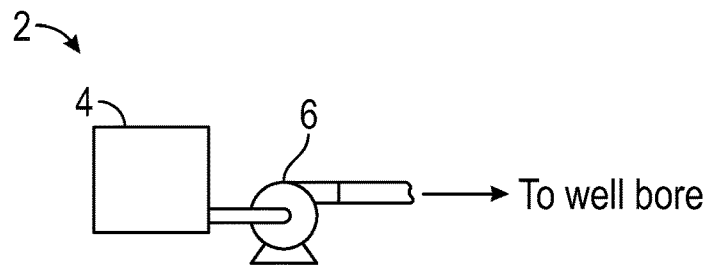
FIG. 1 illustrates a system for preparation and delivery of a treatment fluid comprising a pH adjusted carrier fluid and hollow particles to a wellbore.

The present disclosure provides methods, compositions, and systems embodying the expansion of annular fluids through the introduction of hollow particles ("HP") in closed casing annuli that can mitigate excessive pressure build-up, wherein the excessive pressure might otherwise compromise the mechanical integrity of casing tubulars. This excessive pressure build-up in closed casing annuli is referred to as annular pressure build-up ("APB"). HP may be used to mitigate APB in oil and gas wells by enabling pressure induced volume change. The HP may be introduced into the wellbore in a treatment fluid comprising a liquid suspension comprising HP and a pH adjusted carrier fluid. The pH adjusted carrier fluid may be an acidic carrier fluid or an alkaline carrier fluid. The treatment fluid comprising HP and a pH adjusted carrier fluid may be introduced into the wellbore followed by a spacer fluid, wherein the cement composition may be introduced into the wellbore after the spacer fluid, wherein the spacer fluid may separate the treatment fluid from the cement composition. The pH adjusted carrier fluid in the treatment fluid may degrade or dissolve the outer wall of at least a portion of the HP, thereby releasing gas encapsulated therein, so as to desirably mitigate or prevent an undesirable build-up of pressure within the annulus. Consequently, the released gas may provide a cushion to allow expansion caused by APB.

Examples of Hollow Particles ("HP")

Any of a variety of suitable hollow particles may be used. The HP may be spherical or non-spherical in shape. Examples of suitable hollow particles may include, but are not limited to, glass particles, glass microparticles, or combinations thereof. The HP may comprise materials including, but not limited to, borosilicates, synthetic borosilicate, glass, soda lime, fly ash, ceramic, or combinations thereof. In general, the HP may refer to any glassy, hollow particles of the appropriate size which may be used in wellbore operations. The HP disclosed herein may also refer to cenospheres, which are a by-product or waste-by product of coal. The HP disclosed herein may also refer to vacuum hollow particles comprising glass, and wherein the vacuum hollow particles may have an interior gas pressure of from about 0.1 mbar to about 1 mbar.

The HP may have any suitable particle size. For example, the HP may have a $D_{10}$ particle size distribution of about 10 microns to about 21 microns, about 11 microns to about 20 microns, about 12 microns to about 18 microns, about 13 microns to about 17 microns, or about 14 microns to about 16 microns. By way of further example, the HP may have a $D_{50}$ particle size distribution of about 18 microns to about 42 microns, about 19 microns to about 41 microns, about 20 microns to about 40 microns, about 21 microns to about 39 microns, about 22 microns to about 38 microns, about 23 microns to about 37 microns, about 24 microns to about 36 microns, or about 25 microns to about 35 microns. By way of further example, the HP may have a $D_{90}$ particle size distribution of about 28 microns to about 78 microns, about 30 microns to about 75 microns, about 35 microns to about 70 microns, about 40 microns to about 65 microns, or about 45 microns to about 60 microns. However, particle sizes outside these defined ranges also may be suitable for particular applications. Particle sizes may be measured using various methods, including using a laser light scattering particle size analyzer. The HP may have any suitable density. For example, the HP may have a nominal density of about 16 lb/ft$^3$ (0.25 g/cc) to about 41 lb/ft$^3$ (0.65 g/cc), about 17 lb/ft$^3$ (0.28 g/cc) to about 37 lb/ft$^3$ (0.60 g/cc), about 19 lb/ft$^3$ (0.30 g/cc) to about 34 lb/ft$^3$ (0.55 g/cc) or about 22 lb/ft$^3$ (0.35 g/cc) to about 31 lb/ft$^3$ (0.50 g/cc).

The desired degradation, collapse, reduction in volume, weakening, or crushing of the HP may be achieved by dissolution of the outer wall of the HP. This degradation, collapse, reduction in volume, weakening, or crushing of the HP may provide a desired amount of expansion volume for other fluids within an annulus, e.g., a spacer fluid, preflush fluid, drilling fluid, or completion fluid composition, and may desirably affect the pressure in the annulus. Generally, the HP disclosed herein may be able to withstand the rigors of being pumped and may remain intact until after their placement into the subterranean annulus. The HP may have a failure pressure rating of from about 4,000 psi (27,579 kPa) to about 10,000 psi (68,948 kPa), about 5,000 psi (34,474 kPa) to about 9,000 psi (62,053 kPa), or about 6,000 psi (41,369 kPa) to about 8,000 psi (55,158 kPa). However, failure rates outside these ranges may also be acceptable so long as the degradation rate of these microparticles can provide the desired response.

Generally, the HP disclosed herein may be present in the treatment fluids in an amount sufficient to provide a desired amount of expansion volume upon dissolution, collapse, or reduction in volume, or weakening of the HP, for other fluids within an annulus. The concentration of the HP in the treatment fluids may depend on factors such as the magnitude of the anticipated APB, the volume in the subterranean annulus that the operator may allocate for placement and trapping of the well fluid, and the volume relief that may be provided by a particular volume of HP. The magnitude of the anticipated APB may be determined by performing calculations available to those of ordinary skill in the art. For example, an operator may determine the approximate amount of volume relief needed to prevent an undesirable buildup of pressure in a subterranean annulus. Thereafter, knowing the amount of volume relief that the HP may provide, the operator may then calculate the requisite volume of the HP that may provide the desired volume relief.

In certain embodiments wherein a limited amount of volume may be available in a subterranean annulus that may be allocated for placement and trapping of the treatment fluid, the incorporation of the requisite volume of the HP needed to provide the desired volume relief may result in a relatively higher concentration of the HP in the treatment fluid than in certain embodiments having unlimited or less limited volume in the annulus that may be allocated for placement and trapping of the well fluid. In certain embodiments, the HP may be present in the treatment fluid in an amount in the range of from about 10% to about 90% by volume of the treatment fluid. Alternatively, the HP may be present in the treatment fluid in an amount in the range of from about 10% to about 90%, from about 20% to about 80%, from about 30% to about 70%, for from about 40% to about 60% by volume of the treatment fluid.

The HP may be introduced into the subterranean annulus using any suitable technique. For example, the HP may be pumped through the shoe of the casing string, whereby the HP may be exposed to maximum bottom hole pressure, wherein the HP must survive without being crushed. Thereafter, the purposeful degradation of the HP may predict their failure at a much lower pressure, wherein the degradation may be typically produced by thermal heat from produced hydrocarbons. The HP may comprise an outer wall that encapsulates atmospheric gas. The failure of the HP at low pressure may cause the release of encapsulated atmospheric gas. The release of the encapsulated gas may act as a compressible volume to protect the mechanical system from excessive pressure increase as the system temperature warms. The released gas may function as a compressible volume and may thereby absorb any pressure arising from wellbore operations which may otherwise cause the pressure in the annulus to exceed material failure limits. A portion of the HP may contain a vacuum instead of gas, which may also be utilized in methods, compositions, and systems disclosed herein.

Examples of Liquid Suspension With HP

The HP may be provided in a liquid suspension. The liquid suspension may comprise an aqueous fluid, HP, a suspending aid, and a stabilizer. The liquid suspension disclosed herein may be a storable liquid suspension. As disclosed herein, "storable" and all variations thereof refers to the static storage of the liquid suspension in a homogenous state. As used herein, "static" means without agitation, such as stirring or mixing of the liquid suspension while stored in the container, but does not include moving the container, for example, to transport it; or removing the liquid suspension from the container, for example, by pouring or draining the container. As used herein, "homogenous" refers to a suspension having a range of density from the top of the container to the bottom of the container of less than 1 lb/gal (120 kg/m$^3$). In some embodiments, the liquid suspension may be stored for four months or longer. The extended storage life of the liquid suspension comprising HP may permit the liquid suspension to be produced off-site from an oil rig, thereby eliminating specialized surface equipment requirement on location. The off-site production of the liquid suspension comprising HP may also allow tailored design of the composition to meet specific APB requirements.

The aqueous fluid comprising the liquid suspension may generally be from any source, including the subterranean formation. In some embodiments, the aqueous fluid may comprise fresh water, acidified water, salt water, seawater, brine, or an aqueous salt solution. In some embodiments, the aqueous fluid may comprise a monovalent brine or a divalent brine. Suitable monovalent brines may include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. The aqueous fluid may be present in the liquid suspension in any suitable amount, for example, in an amount of about 10% to about 90% by weight of the liquid suspension. Alternatively, the aqueous fluid may be present in the liquid suspension in an amount of about 10% to about 90%, about 20% to about 80%, about 30% to about 70% or about 40% to about 60% by weight of the liquid suspension.

The HP may be present in the liquid suspension in any suitable amount. In some embodiments, the concentration of the HP in the liquid suspension may be in the range of about 25% to about 75% by volume of the liquid suspension. Alternatively, the concentration of the hollow particles in the liquid suspension may be about 25% to about 75%, about 30% to about 70%, about 35% to about 65%, about 40% to about 60%, or about 45% to about 55% by volume of the liquid suspension.

General examples of suspending aids included in the liquid suspension may include, but are not limited to, polymers and clays. In some embodiments, polymers may include, but are not limited to, diutan gums, scleroglucan, guar gums, carrageenans, xanthan gums, welan, celluloses, hydroxyethyl celluloses, and combinations thereof. In some embodiments, clays may include bentonite, attapulgite, sepiolite, vermiculite, illite, muscovite, biotite, kaolinite, cookeite, halloysite, flint clay, montmorillonite, hectorite, laponite, and combinations thereof. The suspending aid may be present in the liquid suspension in any suitable amount, including in the range of about 0.1% to about 30% by volume of the liquid suspension. Alternatively, the suspending aid may be present in the liquid suspension in a range of about 0.1% to about 30%, about 1% to about 29%, about 2% to about 28%, about 3% to about 27%, about 5% to about 25%, or about 10% to about 20% by volume of the liquid suspension.

The liquid suspension may comprise a stabilizer, wherein the stabilizer may be divided into two categories which include non-ionic surfactants and particle-packing stabilizers. In some embodiments non-ionic surfactants may include, but are not limited to, polyethylene oxide, polypropylene oxide, polyethyleneglycol alkyl ethers, polypropylene alkyl ethers, glucoside alkyl ethers, polyethyleneglycol alkylphenyl ethers, glycerol alkyl esters, sorbitan alkyl esters, polyethylene glycol/polypropylene glycol block copolymers, the like, derivatives thereof, or mixtures thereof. In some embodiments, the non-ionic surfactant may be present in the liquid suspension in the range of about 0.1% to about 30% by weight of the liquid suspension. Alternatively, the non-ionic surfactant may be present in the liquid suspension in a range of about 0.1% to about 30%, about 1% to about 29%, about 2% to about 28%, about 3% to about 27%, about 5% to about 25%, or about 10% to about 20% by weight of the liquid suspension.

The particle-packing stabilizers may be provided to the liquid suspension as a suspension of particles, an emulsion of particles, or as particulate matter to be dispersed in the liquid suspension. The average particle size of the particles in the particle-packing stabilizer is in the range of about 100 nm to about 10 microns. Alternatively, the average particle size of the particles in the particle-packing stabilizer may be about 100 nm to about 10 microns, about 250 nm to about 7.5 microns, about 500 nm to about 5 microns, or about 750 nm to about 2.5 microns. However, particle sizes outside these defined ranges also may be suitable for particular applications. Without limitation by theory, particle-packing stabilizers may be used to separate the HP and prevent or reduce the close packing of HP by insertion of the particle-packing stabilizer into the inter-particle spaces between the HP such that sufficient separation between the HP is maintained. Examples of particle-packing stabilizers include latex, oleaginous fluids, particulate porous silica, or combinations thereof.

The latex may comprise any of a variety of rubber materials available in latex form. For example, natural rubber (cis-1,4-polyisoprene) in most of its modified types may be utilized. Synthetic polymers of various types may also be used, including styrene-butadiene rubber, cis-1,4-polybutadiene rubber, high styrene resin, butyl rubber, ethylene-propylene rubbers, neoprene rubber, nitrile rubber, cis-/trans-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, blends thereof, derivatives thereof, or combinations thereof. The rubber materials may be commercially available in latex form, i.e., aqueous dispersions or emulsions which are utilized directly.

In some embodiments, the concentration of the latex in the liquid suspension may be in the range of about 0.1% to about 75% by volume of the liquid suspension. Alternatively, the concentration of the latex in the liquid suspension may be about 0.1% to about 75%, about 0.5% to about 70%, about 1% to about 65%, about 5% to about 60%, about 10% to about 55%, about 15% to about 50%, about 20% to about 45%, or about 25% to about 40% by volume of the liquid suspension.

General examples of oleaginous fluids may include, but are not limited to, petroleum oils, natural oils, synthetically derived oils, or combinations thereof. More particularly, oleaginous fluids may include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof. In some embodiments, the concentration of the oleaginous fluid in the liquid suspension may be in the range of about 0.1% to about 30% by volume of the liquid suspension. Alternatively, the concentration of the oleaginous fluid in the liquid suspension may be about 0.1% to about 30%, about 0.5% to about 25%, about 1% to about 20%, or about 5% to about 15% by volume of the liquid suspension.

In some embodiments, the particle-packing stabilizer may be a particulate porous silica. Particulate porous silica may be obtained commercially or prepared by precipitation. For example, sulfuric acid and a sodium silicate solution may be added to water in a reaction vessel with high agitation. The mixture of acid, sodium silicate and water must be mixed at a high rate to prevent the formation of low pH areas where gelation may occur. Since silica dissolves to form silicate at a pH value above about 9, smaller particles may be continuously dissolved during the precipitation process and therefore, uniform particle sizes are obtained. As the silica precipitation progresses, the small particles may aggregate through siloxane bridges to form three dimensional networks that resist the high capillary pressure that develops during drying. After drying, the precipitated particulate silica may be porous and may remain dry and free flowing after absorbing liquids.

In some embodiments, the concentration of the particulate porous silica in the liquid suspension may be in the range of about 0.1% to about 30% by volume of the liquid suspension. Alternatively, the concentration of the particulate porous silica in the liquid suspension may be about 0.1% to about 30%, about 0.5% to about 25%, about 1% to about 20%, or about 5% to about 15% by volume of the liquid suspension. However, concentrations outside these defined ranges also may be suitable for particular applications.

The liquid suspension may be further comprised of a defoaming agent, wherein the defoaming agent may prevent foaming during mixing of the liquid suspension. The defoaming agent may include, but may not be limited to, polyols, silicon defoamers, alkyl polyacrylates, ethylene oxide/propylene oxide compounds, acetylenic diols, and any combination thereof. The defoaming agent may be present in the liquid suspension in the range of about 0.1% to about 10% by volume of the liquid suspension. Alternatively, the concentration of the defoaming agent in the liquid suspension may be about 0.1% to about 10%, about 0.5% to about 7%, about 1% to about 5%, or about 2% to about 4% by volume of the liquid suspension. However, concentrations outside these defined ranges also may be suitable for particular applications.

The liquid suspension may further comprise a dispersant, wherein the dispersant may assist in controlling the rheology of the liquid suspension. The dispersant may include, but may not be limited to, naphthalene sulfonic acid condensate with formaldehyde; acetone, formaldehyde, and sulfite condensate; melamine sulfonate condensed with formaldehyde; or any combination thereof. The concentration of the dispersant in the liquid suspension may be in the range of about 0.1% to about 5% by volume of the liquid suspension. Alternatively, the concentration of the dispersant in the liquid suspension may be about 0.1% to about 5%, about 0.5% to about 4%, or about 1% to about 3% by volume of the liquid suspension. However, concentrations outside these defined ranges also may be suitable for particular applications.

Generally, the liquid suspension may have a density suitable for a particular application. By way of example, the liquid suspension may have a density of about 5 lb/gal (599 kg/m$^3$) to about 10 lb/gal (1198 kg/m$^3$). Alternatively, the density of the liquid suspension may be about 5 lb/gal (599 kg/m$^3$) to 10 lb/gal (1198 kg/m$^3$), about 6 lb/gal (719 kg/m$^3$) to about 9 lb/gal (1078 kg/m$^3$), or about 7 lb/gal (839 kg/m$^3$) to about 8 lb/gal (959 kg/m$^3$). However, concentrations outside these defined ranges also may be suitable for particular applications.

As previously mentioned, the liquid suspension may be stored until desired for use. In some embodiments, the liquid suspension may be stored in a static state and may remain homogenous while stored. The storable liquid suspension may be characterized in that it may be statically stored in a homogenous, non-setting or non-settable, flowable fluid state for a time of four months or longer at room temperature. For example, the liquid suspension may be statically stored in a homogenous, non-setting or non-settable, flowable fluid state for a period of time from about 1 week, about 2 weeks, about 3 weeks, about 4 weeks, about 2 months, about 3 months, about 4 months, or longer, wherein a flowable fluid state may be defined as a fluid having a viscosity of less than 2000 Cp.

The liquid suspension comprising HP may be added to a variety of treatment fluid when desired for use. For example, the treatment fluids may include, but are not limited to, water-based drilling fluids, cement slurries, completion fluids, displacement fluids, conformance fluids, and the like. The treatment fluid may be introduced into a wellbore to perform a wellbore operation. Although the suspensions comprising the HP may be introduced into the wellbore in a treatment fluid, the suspensions may also be introduced directly into the wellbore absent being mixed with a treatment fluid.

Examples of Treatment Fluids

A method for preparing the treatment fluid disclosed herein may comprise adding the liquid suspension comprising HP to a pH adjusted carrier fluid, wherein the pH adjusted carrier fluid may be an acidic carrier fluid or an alkaline carrier fluid. The acidic or alkaline carrier fluid may facilitate degradation of the HP. The intentional degradation or dissolution of the outer wall of the HP requires a highly acidic or highly alkaline mixture. The composition of the pH adjusted carrier fluid may be designed to minimize or maximize the time required to degrade the HP, so that degradation of the outer wall of the HP is accomplished in a sufficiently minimal time period. In essence, the composition of the pH adjusted carrier fluid may be designed to control the degradation or dissolution rate of the outer wall of the HP. The carrier fluid may be non-settable such that it does not set to form a hardened mass after placement into a wellbore.

The pH adjusted carrier fluid may react with the outer wall of the HP such that it degrades or dissolves the outer wall of the HP and reduces the ability of the HP to withstand pressure below its pressure rating. As such, the HP may be able to withstand pressure required for placement into the annulus, but due to the degradation may collapse in response to increased pressure after placement in the annulus due to APB. In general, the HP may be present in the pH adjusted carrier fluid, wherein the pH adjusted carrier fluid will be added to the treatment fluid, in an amount sufficient to provide a desired volume of pressure reduction upon collapse. The amount of HP may be determined by taking into account a number of factors including, for example, the magnitude of the anticipated pressure buildup, volume of pressure relief that may be needed, and the available volume in the wellbore annulus.

The acidic carrier fluid may comprise an aqueous fluid and an acid. The acid included in the acidic carrier fluid may comprise any of a variety of acids or acid generating compounds. Examples of suitable acids may include strong acids, such as hydrochloric acid and sulfuric acid. Additional corrosive acids may also be used, including hydrofluoric acid. In general, any acid (or combination of acids) may be used so long as the acid is sufficiently corrosive to dissolve glass, and any combinations thereof.

Acid-generating compounds may include any esters and formates that are water soluble or partially soluble. Particularly, acid-generating compounds may include lactic acid derivatives, methyl lactate, ethyl lactate, propyl lactate, and butyl lactate. Additionally, acid-generating compounds may include formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Esters may include esters or polyesters of glycerol including, but not limited to, tripropionin (a triester of propionic acid and glycerol), trilactin, and esters of acetic acid and glycerol, such as monoacetin, diacetin, and triacetin. Optionally, the acid-generating compound(s) may include esters; aliphatic polyesters; poly(lactides); poly(glycolides); poly(ε-caprolactones); poly(hydroxybutyrates); poly(anhydrides); aliphatic polycarbonates; poly(amino acids); and polyphosphazenes; copolymers thereof; and combinations thereof.

The acid may be present in the acidic carrier fluid in any suitable amount. For example, the acid may be present in an amount of about 1% to about 50% by volume. Alternatively, the acid or acid generating compound may be present in the acidic carrier fluid in an amount of about 1% to about 50% by volume, about 5% to about 45%, about 10% to about 40%, about 15% to about 35%, or about 20% to about 30% by volume of acidic carrier fluid.

The aqueous fluid may be present in the acidic carrier fluid in any suitable amount, including an amount of about 50% to about 99% by volume of the acidic carrier fluid. Alternatively, the aqueous fluid may be present in the acidic carrier fluid in an amount of about 50% to about 99%, about 55% to about 95%, about 60% to about 90%, about 65% to about 85%, or about 70% to about 80% by volume of the acidic carrier fluid.

The acidic carrier fluid may also comprise a corrosion inhibitor, for example, to protect well casing tubulars from the corrosive effects of the acid. The corrosion inhibitors may include, but are not limited to, sulphur-containing heterocyclic compounds, nitrogen-containing heterocyclic compounds, thiophene, hydrazine derivatives, phosphates, chromates, dichromates, silicates, borates, tungstates, molybdates, arsenates, Pyrrole, derivativities thereof, and combinations thereof. Alternative corrosion inhibitors may include, but are not limited to, organic substances containing polar functions with nitrogen, sulphur, and/or oxygen in a conjugated system, and combinations thereof. The corrosion inhibitor may be present in the acidic carrier fluid in an amount of about 0.01% to about 10% by weight of the acidic carrier fluid. Alternatively, the corrosion inhibitor may be present in the acidic carrier fluid in an amount of about 0.01% to about 10%, about 0.05% to about 9%, about 1% to about 8%, about 2% to about 7%, about 3% to about 6%, or about 4% to about 5% by weight of the acidic carrier fluid. The acidic carrier fluid may have a pH in the range of about 0.0 to about 6.9. Alternatively, the acidic carrier fluid may have a pH in the range of about 0 to about 6.9, about 0.1 to about 5.5, about 0.3 to about 3.5, or about 0.5 to about 1.5.

The alkaline carrier fluid may comprise an aqueous fluid and a basic salt. The basic salt included in the alkaline carrier fluid may comprise any suitable basic salt. Basic salts are the product of the neutralization of a strong base and a weak acid and typically yield a solution of greater than 7 when dissolved in water. Examples of suitable basic salts may include, but are not limited to, sodium hydroxide, potassium hydroxide, calcium hydroxide, sodium carbonate, sodium acetate, potassium cyanide, sodium sulfide, sodium bicarbonate, sodium hydroxide, or combinations thereof. When dissolved in the aqueous fluid, the basic salt should form a strong base, such as sodium hydroxide, potassium hydroxide, or calcium hydroxide.

In some examples, the alkaline carrier fluid may comprise strong basic salts, such as sodium hydroxide, as stated above. The basic salts may be separated from metal hydroxides. More specifically, the alkaline carrier fluid may be comprised of a metal hydroxide for baseline dissolution. The addition of salts ("additional salts"), including, but not limited to lithium chloride, sodium chloride, potassium chloride, magnesium chloride, calcium chloride, lithium nitrate, potassium nitrate, magnesium nitrate, sodium fluoride, sodium bromide, sodium carbonate, sodium sulfate, sodium nitrate, sodium nitrite, sodium acetate, sodium bromide, sodium lactate, sodium succinate, sodium benzoate, sodium tartrate, sodium salicylate, sodium phthalate, sodium citrate, sodium malate, sodium propionate, or combinations thereof, may enhance or retard the solubility of the HP in a metal hydroxide base. Hence, in some examples the alkaline carrier fluid may comprise a metal hydroxide carrier fluid; whereas, in other examples the alkaline carrier fluid may comprise a metal carrier fluid combined with the aforementioned additional salts. Additionally, the alkaline carrier fluid may comprise Portland cement, cement kiln dust, lime kiln dust, red mud, or combinations thereof.

The aqueous fluid may be present in the alkaline carrier fluid in any suitable amount, including an amount of about 1 to about 50 weight %. The basic hydroxides may be present in the alkaline carrier fluid in an amount of about 1 to about 50 weight %. The electrolyte sodium salts may be present in the alkaline carrier fluid in an amount of about 2 to about 200% by weight of basic hydroxide.

Further, one or more additional salts may be included in the alkaline carrier fluid to further tailor degradation of the HP. The additional salts may be selected to either increase or decrease the rate of solubility of the HP. For example, chlorides and nitrates with divalent cations may decrease solubility. It should be understood that the dissolution or degradation rate of the outer wall of the HP may substantially increase for pH>10. Conversely, the dissolution or degradation rate of the outer wall of the HP may be relatively low or essentially constant for pH values between 5.6 and 10 ($5.6 \leq pH \leq 10$). In some embodiments, the one or more additional salts may be added to provide a hyperalkaline environment in the alkaline carrier fluid. By way of example, the alkaline carrier fluid may further comprise one or more electrolyte sodium salts, such as sodium bromide, sodium benzoate, sodium malonate, disodium malonate, sodium citrate, or other salts, such as the additional salts above, which may induce a hyperalkaline environment. As used herein, the term hyperalkaline refers to an environment having a pH value of 12.

In some embodiments, an enhancement of the degradation or dissolution rate of the HP may be induced by the addition of the electrolyte sodium salts, for example, due to the formation of strong inner-sphere surface complexes with either silicon or charge-compensating cations within the glass. The HP degradation or dissolution rates in the presence of the electrolyte sodium salts may be greater than the dissolution or degradation rates in a salt-free carrier fluid with a pH value between 6 and 10 ($6 \leq pH \leq 10$). The ability of a particular salt to enhance the degradation or dissolution rate of the outer wall of the HP may be related to the abundance of surface sites with which the salt ions may interact. Subsequently, surface site speciation may change systematically with increasing pH.

Accordingly, the degradation or dissolution rate of the outer wall of the HP may be tailored using variations in the acidity, alkalinity, and salt concentration, respectively. The extent of pH adjusted carrier fluid saturation with respect to the HP may increase continuously over time. The dissolution or degradation rate of the outer wall of the HP may also vary continuously and may be controlled by the transport of dissolved ions away from the surface of the outer wall of the HP. Hence, whether an acidic carrier fluid or an alkaline carrier fluid is used depends on the desired degradation or dissolution rate. The degradation may therefore be tailored to balance degraded performance within the required period of time versus minimizing potential corrosive risk to tubulars.

In some embodiments, the pH adjusted carrier fluid may be present in the treatment fluid in an amount of from about 40% to about 99% by volume of the treatment fluid. Alternatively, the treatment fluid may comprise the pH adjusted carrier fluid in an amount in a range of from about 40% to about 99%, about 45% to about 95%, about 50% to about 90%, about 55% to about 85%, about 60% to about 80%, or about 65% to about 75% by volume of the treatment fluid.

The treatment fluid disclosed herein may be prepared by combining the HP with the pH adjusted carrier fluid. In some embodiments, the HP may be added to the pH adjusted carrier fluid in the liquid suspension. In some embodiments, the liquid suspension comprising HP may be added to the pH adjusted carrier fluid by flowing the liquid suspension comprising HP out of its storage container. Alternatively, the liquid suspension comprising HP may be agitated prior to flowing the liquid suspension into the pH adjusted carrier fluid. The liquid suspension and the pH adjusted carrier fluid may be mixed onsite or offsite, then the resulting mixture may be added to the treatment fluid disclosed herein. The components of the treatment fluid may be combined using any mixing device compatible with the composition, including a bulk mixer, for example.

As disclosed herein, the resulting treatment fluid may be introduced in a wellbore annulus. For example, the treatment fluid may be pumped ahead of a primary cementing operation. In some embodiments, the treatment fluid may be pumped in front of an appropriately sized inert spacer fluid volume, for the purpose of mitigating any potentially adverse interactions that may be caused by intermixing of the pH adjusted carrier fluid, either acidic or alkaline, and an alkaline cement slurry. The cement slurry may be pumped behind the spacer fluid. Alternatively, the treatment fluid comprising the pH adjusted carrier fluid may be pumped into the wellbore without cement. For example, the treatment fluid comprising the pH adjusted carrier fluid may be used to form a tie-back liner which may be required to provide the necessary pressure capacity during a flow-test period or for special treatments, wherein the tie-back liner is typically not cemented in place.

The resulting treatment fluid may be continuously mixed as it is pumped to the wellbore. The resulting treatment fluid may be placed into position below a wellhead ahead of a standard primary cement job. As defined herein, a "treatment fluid" is a fluid that is placed in a subterranean formation in order to perform a desired function. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. The treatment fluids may be any fluid that may, or is intended to, become trapped within wellbore annulus after the completion of a subterranean cementing operation. In some embodiments, the treatment fluids may be a spacer fluid, a completion fluid, a drilling fluid, or a spotting fluid. A spotting fluid is typically a small volume of fluid placed into a wellbore for a particular purpose or function. A spotting fluid may also be referred to as a "pill".

In addition to the HP and the pH adjusted carrier fluid, the treatment fluid may further comprise additional additives suitable for use with drilling fluids, spacer fluids, completion fluids, and/or spotting fluids. Examples of such additional additives include, without limitation, fluid loss control agents, weighting agents, viscosifiers, oxidizers, surfactants, dispersants, suspending agents, pH increasing materials, pH decreasing materials, lost circulation materials (LCMs), gelling agents, displacement facilitators, and combinations thereof. Examples of specific additives that may be included in the treatment fluids include, but are not limited to, vitrified shale, biopolymers (such as diutan, welan gums, or biozan), clays, diatomaceous earth, metakaolin, silica, sand, silica fume, fly ash, slag, and organic acids (such as citric acid). In some embodiments, the treatment fluid may be foamed, for example, with a foaming surfactant and a gas.

As disclosed herein, a method of servicing a wellbore may comprise the steps of providing HP; adding HP to a liquid suspension fluid; and, storing the liquid suspension fluid in a proper storage vessel until ready to use. The method may further comprise the steps of adding the liquid suspension comprising HP to a pH adjusted carrier fluid, wherein the pH adjusted carrier fluid may be an acidic carrier fluid or an alkaline carrier fluid, thereby forming a mixture; and, adding the mixture comprising the liquid suspension comprising HP and the pH adjusted carrier fluid to a treatment fluid. The method may further comprise introducing the treatment fluid into the wellbore annulus; introducing a spacer fluid into the wellbore annulus after the treatment fluid; introducing a cementing composition into the wellbore annulus after the spacer fluid; and trapping at least a portion of the treatment fluid in the wellbore annulus, wherein the pH adjusted carrier fluid degrades the outer wall of the HP in the wellbore annulus and releases the encapsulated gas. The method may further comprise the steps of displacing a drilling fluid from the wellbore annulus with the treatment fluid; and allowing the cement composition to set.

FIG. 1 illustrates a system 2 for preparation and delivery of a treatment fluid comprising a pH adjusted carrier fluid and hollow particles to a wellbore. As shown, HP and the pH adjusted carrier fluid may be mixed in mixing equipment 4, such as a mixer or recirculating tub, to form the treatment fluid, then the treatment fluid may be pumped via pump 6 to the wellbore. In some embodiments, the HP may be pre-blended with other dry additives of the liquid suspension and then mixed with the pH adjusted carrier fluid to form the treatment fluid, wherein the pH adjusted carrier fluid may be an acidic carrier fluid or an alkaline carrier fluid. Other suitable techniques may also be used for preparation of the treatment fluids comprising the HP and the pH adjusted carrier fluid, as will be appreciated by those of ordinary skill in the art in accordance with example embodiments.

Embodiments of the treatment fluids described herein may be introduced into the wellbore annulus. A spacer fluid may be introduced into the wellbore annulus after the treatment fluid. A cement composition may be introduced into the wellbore annulus after the spacer fluid, wherein the spacer fluid may be positioned between the treatment fluid and the cement composition. The introduction of the treatment fluid into the wellbore annulus, followed by the spacer fluid, then the introduction of the cement composition into the annulus after the spacer fluid may be accomplished by any suitable means. The wellbore annulus may be an annulus between a pipe string (e.g., casing, tubing, etc.) and a subterranean formation and/or between a pipe string and a larger conduit in the wellbore. For example, the treatment fluid disclosed herein may be placed into the wellbore annulus directly from the surface. Alternatively, the treatment fluid may be flowed into the wellbore via the casing and permitted to circulate into place in the wellbore annulus between the casing and the subterranean formation, or between the casing and a large conduit.

Figure 2:
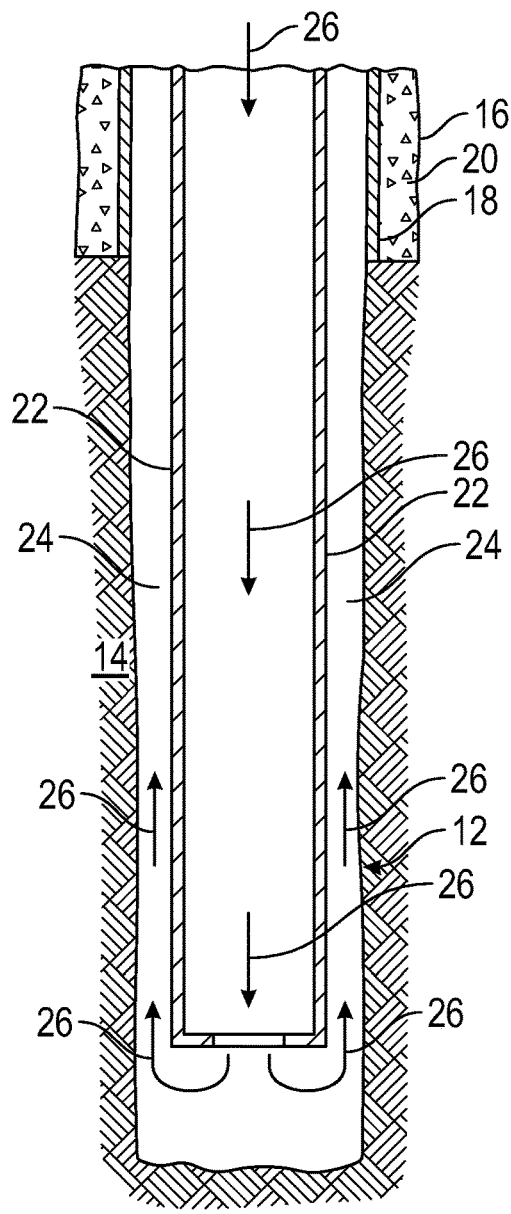
FIG. 2 illustrates placement of a treatment fluid comprising a pH adjusted carrier fluid and hollow particles into a wellbore.

FIG. 2 illustrates placement of the treatment fluid disclosed herein into the wellbore 12 in accordance with some embodiments. As illustrated, the wellbore 12 may be drilled into the subterranean formation 14. While wellbore 12 is shown extending generally vertically into the subterranean formation 14, some embodiments are also applicable to wellbores that extend at an angle through the subterranean formation 14, such as horizontal and slanted wellbores. The wellbore 12 comprises walls 16. As illustrated, a surface casing 18 has been inserted into the wellbore 12. The surface casing 18 may be cemented to the walls 16 of the wellbore 12 by cement sheath 20. In the illustrated embodiment, one or more additional pipe strings, shown here as casing 22 may also be disposed in the wellbore 12. As illustrated, there is a wellbore annulus 24 formed between the casing 22 and the walls 16 of the wellbore 12 and/or the surface casing 18. The treatment fluid disclosed herein may be prepared by a variety of methods as will be apparent to those of ordinary skill. The treatment fluid may then be pumped down the casing 22, as shown in FIG. 2 by directional arrows 26. The treatment fluid may be allowed to flow down through the bottom of the casing 22 and up around the casing 22 into the wellbore annulus 24. The spacer fluid (not shown) may then be pumped down the casing 22, also shown in FIG. 2 by directional arrows 26, after the treatment fluid has been disposed into the wellbore annulus 24. The cement composition may then be pumped down the casing 22, also shown in FIG. 2 by directional arrows 26, after the spacer fluid has been disposed into the wellbore annulus 24. At least a portion of the treatment fluid may be trapped in the wellbore annulus 24, wherein the pH adjusted carrier fluid may degrade the outer wall of HP in the wellbore annulus 24 and release the encapsulated gas therein.

The treatment fluid disclosed herein may be used in various wellbore servicing operations. For instance, the treatment fluid may be a spacer fluid, a drilling fluid, a completion fluid such as a spotting fluid. In accordance with present embodiments, the treatment fluid comprising pH adjusted carrier fluid may be placed into a wellbore annulus. Generally, an operator may circulate one or more additional fluids (e.g., a cement composition) into place within the subterranean annulus behind embodiments of the treatment fluid comprising pH adjusted carrier fluid. At least a portion of embodiments of the treatment fluids comprising pH adjusted carrier fluid then may become trapped within the wellbore annulus.

Figure 3:
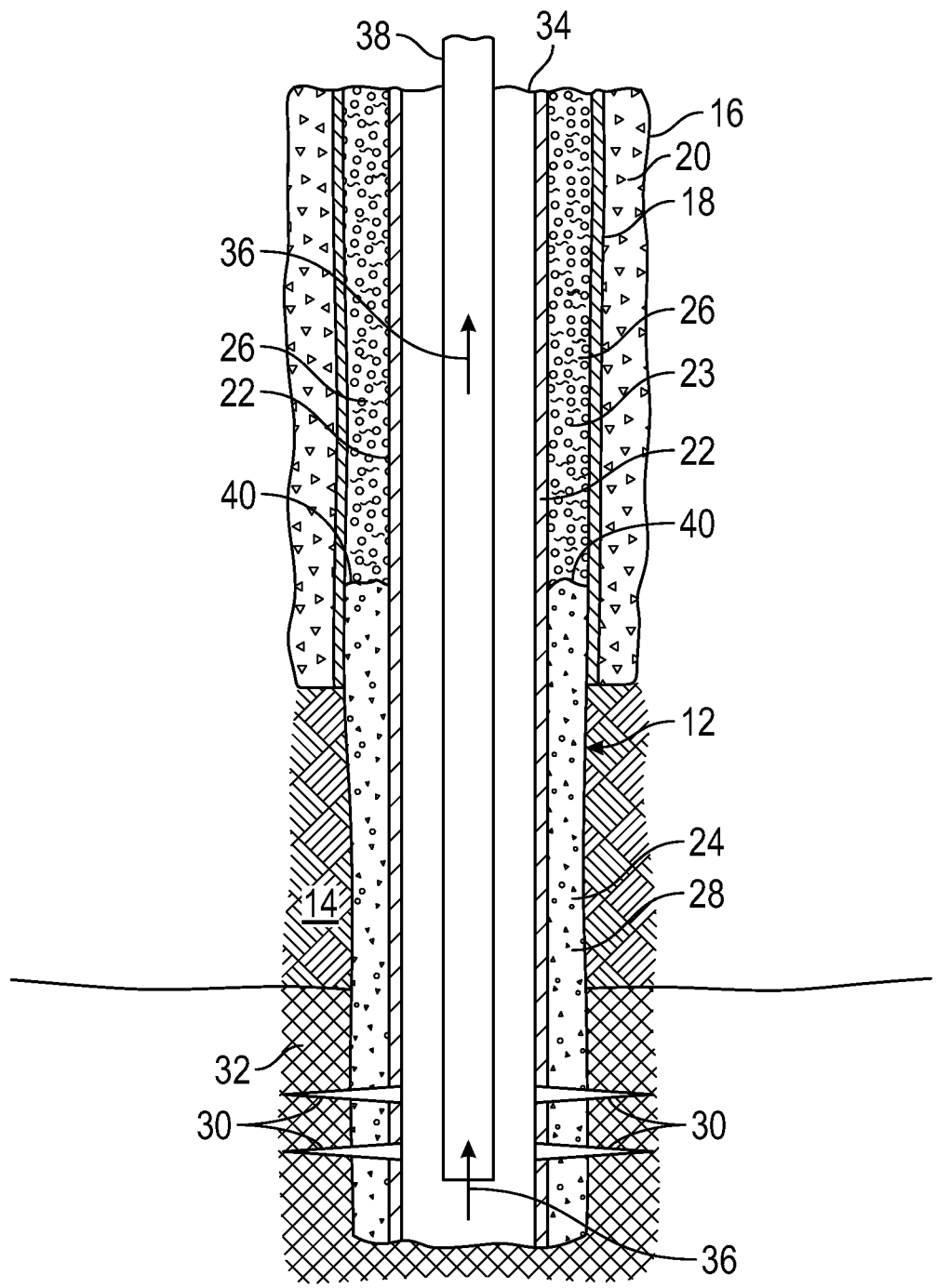
FIG. 3 illustrates a treatment fluid comprising a pH adjusted carrier fluid and hollow particles trapped in a wellbore annulus.

FIG. 3 illustrates treatment fluid 26 disclosed herein comprising HP 23 trapped in a wellbore 12. In some embodiments, the HP 23 may be added to a liquid suspension, wherein the liquid suspension comprising the HP 23 may be added to a pH adjusted carrier fluid, wherein the pH adjusted carrier fluid may be an acidic carrier fluid or an alkaline carrier fluid, thereby forming a mixture that may be added to a treatment fluid to produce a treatment fluid 26 comprising HP 23. The treatment fluid 26 may be introduced and disposed in the wellbore annulus 24, then followed by the introduction of an optional spacer fluid (not shown) into the wellbore annulus 24, then followed by cement sheath 28. The wellbore annulus 24 may be closed such that the treatment fluid 26 may be trapped in the wellbore annulus 24, the wellbore annulus 24 having a fixed volume. Alternatively, the wellbore annulus 24 may be closed such that the treatment fluid 26 and the cement sheath 28 may be trapped in the wellbore annulus 24, the wellbore annulus 24 having a fixed volume. Hydrocarbon production may be initiated from the wellbore 12 at some point in time after the cementing operation is complete. As illustrated, apertures 30 in the cement sheath 28 and the casing 22 may allow hydrocarbons to flow from a producing zone 32 of the subterranean formation 14 up through the casing 22 and to a surface 34, as illustrated by arrows 36. Tubing 38 may be disposed in the casing 22 to provide a conduit for passage of the hydrocarbons. The hydrocarbons may be at elevated temperatures as they flow up through the casing 22 causing fluids, such as suspension fluid 26, to heat and expand. Such an expansion may cause an increase in pressure within the wellbore annulus 24 when the volume is fixed, for example, wherein the top of cement ("TOC") 40 may be inside the previous casing or surface casing 18, or wherein the TOC 40 may be below the previous casing or surface casing 18. The pH adjusted carrier fluid in the treatment fluid 26 may degrade or dissolve the outer wall of at least a portion of the HP 23, thereby releasing gas encapsulated therein, so as to desirably mitigate or prevent an undesirable build-up of pressure within the annulus 24.

Figure 4:
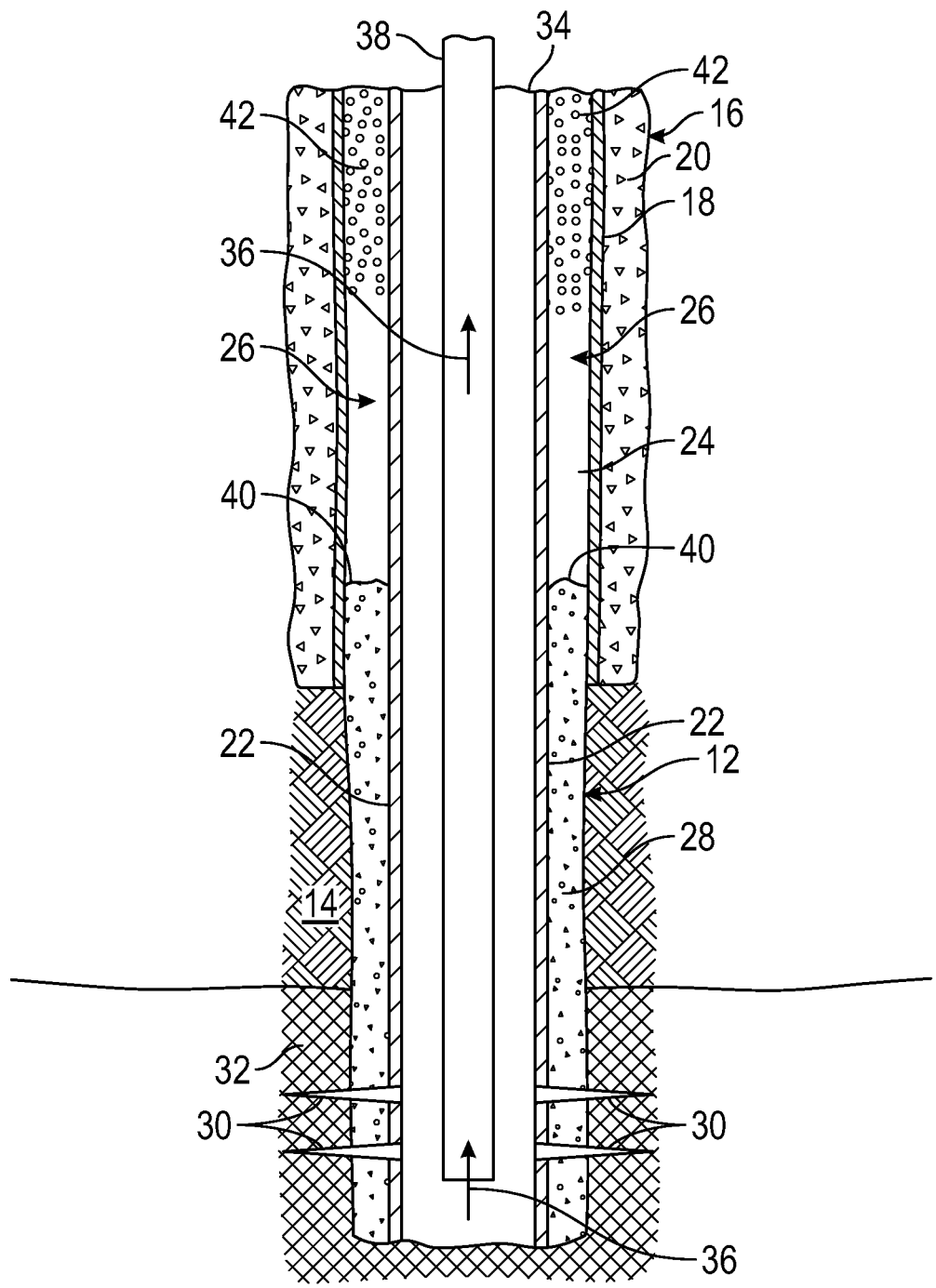
FIG. 4 illustrates a treatment fluid after degradation of hollow particles trapped in a wellbore.

FIG. 4 illustrates treatment fluid 26 disclosed herein after degradation of HP 23 trapped in a wellbore 12. In some embodiments, the HP 23 may be added to a liquid suspension, wherein the liquid suspension comprising the HP 23 may be added to a pH adjusted carrier fluid, wherein the pH adjusted carrier fluid may be an acidic carrier fluid or an alkaline carrier fluid, thereby forming a mixture that may be added to a treatment fluid to produce a treatment fluid 26 comprising HP 23. The treatment fluid 26 may be introduced and disposed in the wellbore annulus 24, then followed by the introduction of a spacer fluid (not shown) into the wellbore annulus 24, then followed by cement sheath 28. The wellbore annulus 24 may be closed such that the treatment fluid 26 and the cement sheath 28 may be trapped in the wellbore annulus 24, the wellbore annulus 24 having a fixed volume, and wherein the TOC 40 may be inside the previous casing or surface casing 18. Hydrocarbon production may be initiated from the wellbore 12 at some point in time after the cementing operation is complete. As illustrated, apertures 30 in the cement sheath 28 and the casing 22 may allow hydrocarbons to flow from a producing zone 32 of the subterranean formation 14 up through the casing 22 and to a surface 34, as illustrated by arrows 36. Tubing 38 may be disposed in the casing 22 to provide a conduit for passage of the hydrocarbons. The hydrocarbons may be at elevated temperatures as they flow up through the casing 22 causing fluids, such as treatment fluid 26, to heat and expand. Such an expansion may cause an increase in pressure within the wellbore annulus 24 when the volume is fixed, for example. The pH adjusted carrier fluid in the treatment fluid 26 may degrade or dissolve the outer wall of at least a portion of the HP 23, thereby releasing gas 42 encapsulated therein, so as to desirably mitigate or prevent an undesirable build-up of pressure within the annulus 24.

By way of example, the gas 42 may provide a cushion to allow expansion caused by annular pressure buildup.

The treatment fluids disclosed herein may directly or indirectly affect one or more components or pieces of equipment associated with the preparation, delivery, recapture, recycling, reuse, and/or disposal of the disclosed polymeric particulates. For example, the disclosed treatment fluids comprising HP and pH adjusted carrier fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids and/or components thereof, including the liquid suspension comprising HP and the pH adjusted carrier fluid from one location to another, any pumps, compressors, or motors (e.g., topside or downhole) used to drive the treatment fluids and/or components thereof into motion, any valves or related joints used to regulate the pressure or flow rate of the treatment fluids and/or components thereof, and any sensors (i.e., pressure and temperature), gauges, and/or combinations thereof, and the like. The disclosed treatment fluids and/or components thereof may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems, methods, and compositions may include any of the various features disclosed herein, including one or more of the following statements:

Statement 1. A method of servicing a wellbore may be disclosed. The method may include providing a treatment fluid comprising a carrier fluid and hollow particles, wherein the hollow particles may comprise an outer wall that encapsulates a gas. The method may further include introducing the treatment fluid into a wellbore annulus and trapping at least a portion of the treatment fluid in the wellbore annulus, wherein the carrier fluid may degrade the outer wall of the hollow particles in the wellbore annulus and release the encapsulated gas.

Statement 2. The method of statement 1, further comprising displacing a drilling fluid from the wellbore annulus with the treatment fluid; introducing a spacer fluid into the wellbore annulus after the treatment fluid; and introducing a cement composition into the wellbore annulus after the spacer fluid.

Statement 3. The method of statements 1 and 2, wherein the wellbore annulus may have an annular pressure build-up, and wherein the encapsulated gas that is released from the hollow particles may reduce the annular pressure build-up.

Statement 4. The method of any of the preceding statements, wherein the carrier fluid may be an acidic carrier fluid comprising an aqueous fluid and an acid, wherein the acid may be selected from the group consisting of hydrochloric acid, hydrofluoric acid, sulfuric acid, and combinations thereof.

Statement 5. The method of statement 4, wherein the acidic carrier fluid may have a pH of about 0.1 to about 5.5.

Statement 6. The method of statements 4 and 5, further comprising dissolving the outer wall of the hollow particles with the acidic carrier fluid.

Statement 7. The method of statements 1, 2, and 3, wherein the carrier fluid may be an alkaline carrier fluid comprising an aqueous fluid and a hydroxide, wherein the hydroxide may be selected from the group consisting of sodium hydroxide, potassium hydroxide, calcium hydroxide, Portland cement, cement kiln dust, lime kiln dust, red mud, and combinations thereof.

Statement 8. The method of statement 7, wherein the alkaline carrier fluid further comprises an electrolyte sodium salt.

Statement 9. The method of statements 7 and 8, wherein the alkaline carrier fluid may be a hyperalkaline carrier fluid having a pH of at least 12.

Statement 10. The method of any of the preceding statements, further comprising circulating one or more additional fluids after introducing the treatment fluid into the wellbore annulus.

Statement 11. The method of any of the preceding statements, wherein the carrier fluid is present in the treatment fluid in an amount of about 40% to about 99% by volume of the treatment fluid.

Statement 12. The method of any of the preceding statements, wherein the hollow particles are present in an amount of about 1% to about 60% by volume of the treatment fluid.

Statement 13. The method of any of the preceding statements, further comprising providing the hollow particles in a liquid suspension before providing the treatment fluid and preparing the treatment fluid by combining the liquid suspension comprising the hollow particles with the carrier fluid.

Statement 14. The method of statement 13, wherein the liquid suspension further comprises an aqueous fluid, a suspending aid, and a stabilizer, and wherein the liquid suspension has a density of less than 120 kg/m$^3$.

Statement 15. A method of servicing a wellbore may be disclosed. The method may include providing a treatment fluid comprising a carrier fluid and hollow particles, wherein the hollow particles may comprise an outer wall that encapsulates a gas. The method may also comprise introducing the treatment fluid into a wellbore annulus; introducing a spacer fluid into the wellbore annulus after the treatment fluid; introducing a cement composition into the wellbore annulus after the spacer fluid; and trapping at least a portion of the treatment fluid in the wellbore annulus. The carrier fluid may degrade the outer wall of the hollow particles in the wellbore annulus and release the encapsulated gas.

Statement 16. The method of statement 15, further comprising displacing a drilling fluid from the wellbore annulus with the treatment fluid.

Statement 17. The method of statements 15 and 16, wherein the wellbore annulus may have an annular pressure build-up, and wherein the encapsulated gas that is released from the hollow particles may reduce the annular pressure build-up.

Statement 18. A treatment fluid may be disclosed. The treatment fluid may comprise a non-settable carrier fluid and hollow particles, wherein the hollow particles may comprise an outer wall that encapsulates a gas.

Statement 19. The treatment fluid of statement 18, wherein the carrier fluid may be an acidic carrier fluid comprising an aqueous fluid and an acid, the acid may be selected from the group consisting of hydrochloric acid, hydrofluoric acid, sulfuric acid, and combinations thereof.

Statement 20. The treatment fluid of statements 18 and 19, wherein the carrier fluid may be an alkaline carrier fluid comprising an aqueous fluid and a hydroxide, wherein the hydroxide is selected from the group consisting of sodium hydroxide, potassium hydroxide, calcium hydroxide, Portland cement, cement kiln dust, lime kiln dust, red mud, and combinations thereof.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of servicing a wellbore comprising:
    providing a treatment fluid comprising a carrier fluid and hollow particles, wherein the treatment fluid is a first spacer fluid, wherein the hollow particles comprise an outer wall that encapsulates a gas, wherein the gas is at a pressure in a range of about 0.1 mbar to about 1 mbar, and wherein the outer wall comprises glass;
    introducing the treatment fluid into a wellbore annulus;
    trapping at least a portion of the treatment fluid in the wellbore annulus, wherein the carrier fluid at least partially degrades the outer wall of the hollow particles in the wellbore annulus; and
    allowing the hollow particles to rupture and release the encapsulated gas.

2. The method of claim 1, further comprising displacing a drilling fluid from the wellbore annulus with the treatment fluid; introducing a second spacer fluid into the wellbore annulus after the treatment fluid; and introducing a cement composition into the wellbore annulus after the second spacer fluid.

3. The method of claim 1, wherein the wellbore annulus has an annular pressure build-up, and wherein the encapsulated gas that is released from the hollow particles reduces the annular pressure build-up.

4. The method of claim 1, wherein the carrier fluid is an acidic carrier fluid comprising an aqueous fluid and an acid, the acid selected from the group consisting of hydrochloric acid, hydrofluoric acid, sulfuric acid, and combinations thereof.

5. The method of claim 4, wherein the acidic carrier fluid has a pH of about 0.1 to about 5.5.

6. The method of claim 4, further comprising dissolving the outer wall of the hollow particles with the acidic carrier fluid.

7. The method of claim 1, wherein the carrier fluid is an alkaline carrier fluid comprising an aqueous fluid and a hydroxide, the hydroxide selected from the group consisting of sodium hydroxide, potassium hydroxide, calcium hydroxide, Portland cement, cement kiln dust, lime kiln dust, red mud, and combinations thereof.

8. The method of claim 7, wherein the alkaline carrier fluid further comprises an electrolyte sodium salt.

9. The method of claim 7, wherein the alkaline carrier fluid is a hyperalkaline carrier fluid having a pH value of at least 12.

10. The method of claim 1, further comprising circulating one or more additional fluids after introducing the treatment fluid into the wellbore annulus.

11. The method of claim 1, wherein the carrier fluid is present in the treatment fluid in an amount of about 40% to about 99% by volume of the treatment fluid.

12. The method of claim 1, wherein the hollow particles are present in an amount of about 1% to about 60% by volume of the treatment fluid.

13. The method of claim 1, further comprising: providing the hollow particles in a liquid suspension before providing the treatment fluid; and preparing the treatment fluid by combining the liquid suspension comprising the hollow particles with the carrier fluid.

14. The method of claim 13, wherein the liquid suspension further comprises an aqueous fluid, a suspending aid, and a stabilizer, and wherein the liquid suspension has a density of less than 120 kg/m$^3$.

15. A method of servicing a wellbore comprising:
providing a treatment fluid comprising a non-settable carrier fluid and hollow particles, wherein the hollow particles comprise an outer wall that encapsulates a gas, wherein the gas is at a pressure in a range of about 0.1 mbar to about 1 mbar, and wherein the outer wall comprises glass;
introducing the treatment fluid into a wellbore annulus, wherein the treatment fluid is a first spacer fluid;
introducing a second spacer fluid into the wellbore annulus after the treatment fluid;
introducing a cement composition into the wellbore annulus after the second spacer fluid; and
trapping at least a portion of the treatment fluid in the wellbore annulus, wherein the carrier fluid at least partially degrades the outer wall of the hollow particles in the wellbore annulus; and
allowing the hollow particles to rupture and release the encapsulated gas.

16. The method of claim 15, further comprising displacing a drilling fluid from the wellbore annulus with the treatment fluid.

17. The method of claim 15, wherein the wellbore annulus has an annular pressure build-up, and wherein the encapsulated gas that is released from the hollow particles reduces the annular pressure build-up.

18. A method of servicing a wellbore comprising:
providing a treatment fluid comprising a carrier fluid and hollow particles, wherein the hollow particles comprise an outer wall that encapsulates a gas, wherein the gas is at a pressure in a range of about 0.1 mbar to about 1 mbar, and wherein the outer wall comprises glass;
introducing the treatment fluid into a wellbore annulus, wherein the treatment fluid is a first spacer fluid;
displacing a drilling fluid from the wellbore annulus with the treatment fluid;
introducing a second spacer fluid into the wellbore annulus after the treatment fluid;
introducing a cement composition into the wellbore annulus after the second spacer fluid;
trapping at least a portion of the treatment fluid in the wellbore annulus, wherein the carrier fluid at least partially degrades the outer wall of the hollow particles in the wellbore annulus; and
allowing the hollow particles to rupture and release the encapsulated gas.

19. The method of claim 18 where the hollow particles are provided in a liquid suspension before providing the treatment fluid; and wherein the method further comprises preparing the treatment fluid by combining the liquid suspension comprising the hollow particles with the carrier fluid.

20. The method of claim 18 wherein the carrier fluid is an acidic carrier fluid comprising an aqueous fluid and an acid, the acid selected from the group consisting of hydrochloric acid, hydrofluoric acid, sulfuric acid, and combinations thereof.

* * * * *